United States Patent
Hayashi

Patent Number: 6,091,517
Date of Patent: Jul. 18, 2000

[54] ANCHORING MECHANISM FOR A CARRIER DRIVING WIRE IN AN IMAGE PROCESSOR

[75] Inventor: Eiichi Hayashi, Ohmiya, Japan

[73] Assignee: Fuji Photo Optical Co., Ltd., Japan

[21] Appl. No.: 09/038,617

[22] Filed: Mar. 11, 1998

[30] Foreign Application Priority Data

Mar. 11, 1997 [JP] Japan .................................. 9-072795

[51] Int. Cl.[7] .................................................. H04N 1/04
[52] U.S. Cl. .......................... 358/497; 358/494; 358/474
[58] Field of Search .................................... 358/474, 494, 358/497, 498, 496

[56] References Cited

U.S. PATENT DOCUMENTS

| | | | |
|---|---|---|---|
| 4,931,836 | 6/1990 | Matsushita et al. | 355/233 |
| 5,251,039 | 10/1993 | Kusumoto et al. | 358/497 |
| 5,260,811 | 11/1993 | Morikawa | 358/474 |
| 5,570,206 | 10/1996 | Yoshinaga | 358/497 |
| 5,717,503 | 2/1998 | Chien | 358/497 |

*Primary Examiner*—Joseph Mancuso
*Assistant Examiner*—Hien Truong
*Attorney, Agent, or Firm*—Price, Heneveld, Cooper, DeWitt & Litton

[57] ABSTRACT

An anchoring mechanism is disclosed for anchoring a carrier driving wire in an image processor. The wire is clamped between the carrier head of a set screw threaded into the carrier and thereby operatively connect the wire to the carrier. Such improved arrangement not only reduces the number of parts but also facilitates operation of anchoring the wire on the carrier. Specifically, bottom plate sections of a first carrier extend outward from longitudinally opposite ends of a groove serving to hold an illuminating lamp. Each of these bottom plate sections is formed with a bed plate section, which has a threaded hole formed through it. Wire retainer means is provided in proximity to the threaded hole. Upon insertion of the wire in the retainer means, the wire is sufficiently curved to generate a restoring force biasing itself to be pressed against the set screw. Then, as the set screw is threaded into the threaded hole the wire is clamped between the head of the set screw and the bed plate section. The wire is positioned relative to the set screw so that the clamping force of the set screw may generate a reaction force tending to move the first carrier back to its initial position.

5 Claims, 12 Drawing Sheets

ANCHORING MECHANISM FOR A CARRIER DRIVING WIRE IN AN IMAGE PROCESSOR

BACKGROUND OF THE INVENTION

1. Field of the Invention

This invention relates to an image processor used in copying machines, printers, scanners or the like, to read an original image represented on a paper sheet or the like, and to subject this image to various processings, and more particularly, to an improved wire anchoring mechanism operatively associating a carrier serving to scan the original with an electric motor and thereby to drive the carrier.

2. Description of the Related Art

Conventional image processors typically include a carrier that is driven in operative association with a length of wire adapted to be taken up on a pulley driven by an electric motor. To this end, the carrier is linked to the length of wire at an intermediate portion of the length of wire. FIG. 12 schematically illustrates one conventional wire anchoring mechanisms in which a set screw 2 is threaded into a carrier 1 at an appropriate position to anchor wire 3 on carrier 1. More specifically, a washer 4 is interposed between a head of set screw 2 and wire 3 and then set screw 2 is turned so as to anchor the wire 3 between a support surface of carrier 1 and washer 4. This well-known anchoring mechanism is arranged so that a screw driving force may cause neither rotation of washer 4 nor shifting of wire 3.

However, the well-known wire anchoring mechanism described above, requires interposition of washer 4. This requirement correspondingly increases the number of parts and makes operation of anchoring wire 3 on carrier 1 troublesome because a step of inserting set screw 2 into washer 4 requires a high level of care.

SUMMARY OF THE INVENTION

In view of the problems as described above, it is a principal object of the invention to provide an improved anchoring mechanism for a carrier driving wire in an image processor.

To achieve this and other aspects and advantages, the image processor of the present invention comprises: a housing; an image processing unit for processing an image of a scanned original; a carrier being movable from an initial position to a predetermined position in order to scan the original and thereby to direct an image of the original to the image processing unit; a rotatably driven pulley; a wire fastened at one end to the housing and wound at an intermediate position on the rotatably driven pulley; and an anchoring mechanism for anchoring the wire to the carrier. The anchoring mechanism includes a threaded hole formed in the carrier, and a set screw threaded into the threaded hole. The wire is thereby clamped between a head of the set screw and the carrier to operatively connect the carrier to a length of the wire extending from the one end fastened to the housing to the rotatably driven pulley. The anchoring mechanism is configured such that the carrier is biased to move to the initial position as the set screw is threaded into the threaded hole.

To ensure that the initial position of the carrier remains unchanged whether before scanning or after scanning, the initial position is preferably controlled by suitable means such as a stopper. Namely, the movement of the carrier toward the initial position caused by rotation of the set screw is limited by the stopper so that a clamping force may be exerted on the wire so as to wind it on the set screw. Thus, movement of the wire from the set screw's head may be effectively avoided. Therefore, the wire can be reliably clamped between the set screw and the carrier and reliably anchored to the carrier. Additionally, the clamping force biases the carrier to move toward the initial position. In other words, positioning of the carrier may be simultaneously carried out.

The anchoring mechanism of the present invention may further include retainer means formed in the carrier for receiving the wire and causing the wire to be sufficiently curved so as to generate a restoring force biasing the wire to be pressed against the set screw. The retainer means is preferably formed in a position on the carrier so as to be offset relative to a path along which the wire is laid. The retainer means may be formed as a notch provided in the carrier. The retainer means functions to restrict a passage of the wire therethrough and thereby to give the wire a high tension which facilitates operation of clamping the set screw.

These and other features, advantages, and objects of the present invention will be further understood and appreciated by those skilled in the art by reference to the following specification, claims, and appended drawings.

DETAILED DESCRIPTION OF THE EMBODIMENTS

Details of the inventive anchoring mechanism for a carrier driving wire in an image processor will be more fully understood from the description of preferred embodiments given hereunder in reference with the accompanying drawings.

Figure 8:
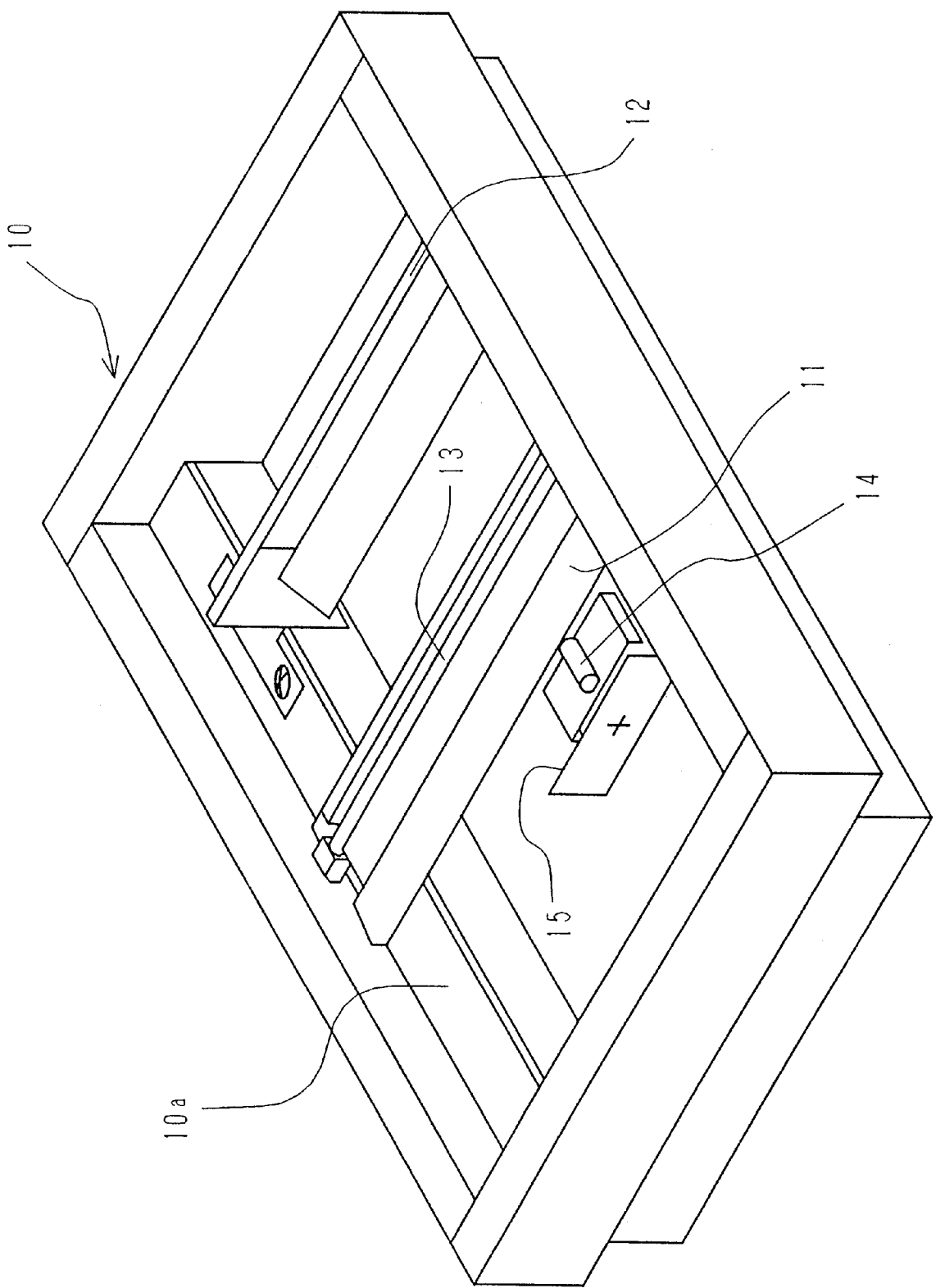
FIG. 8 is a perspective view schematically showing an image processor having a carrier driving mechanism adapted to be provided with the inventive anchoring mechanism.
Figure 9:
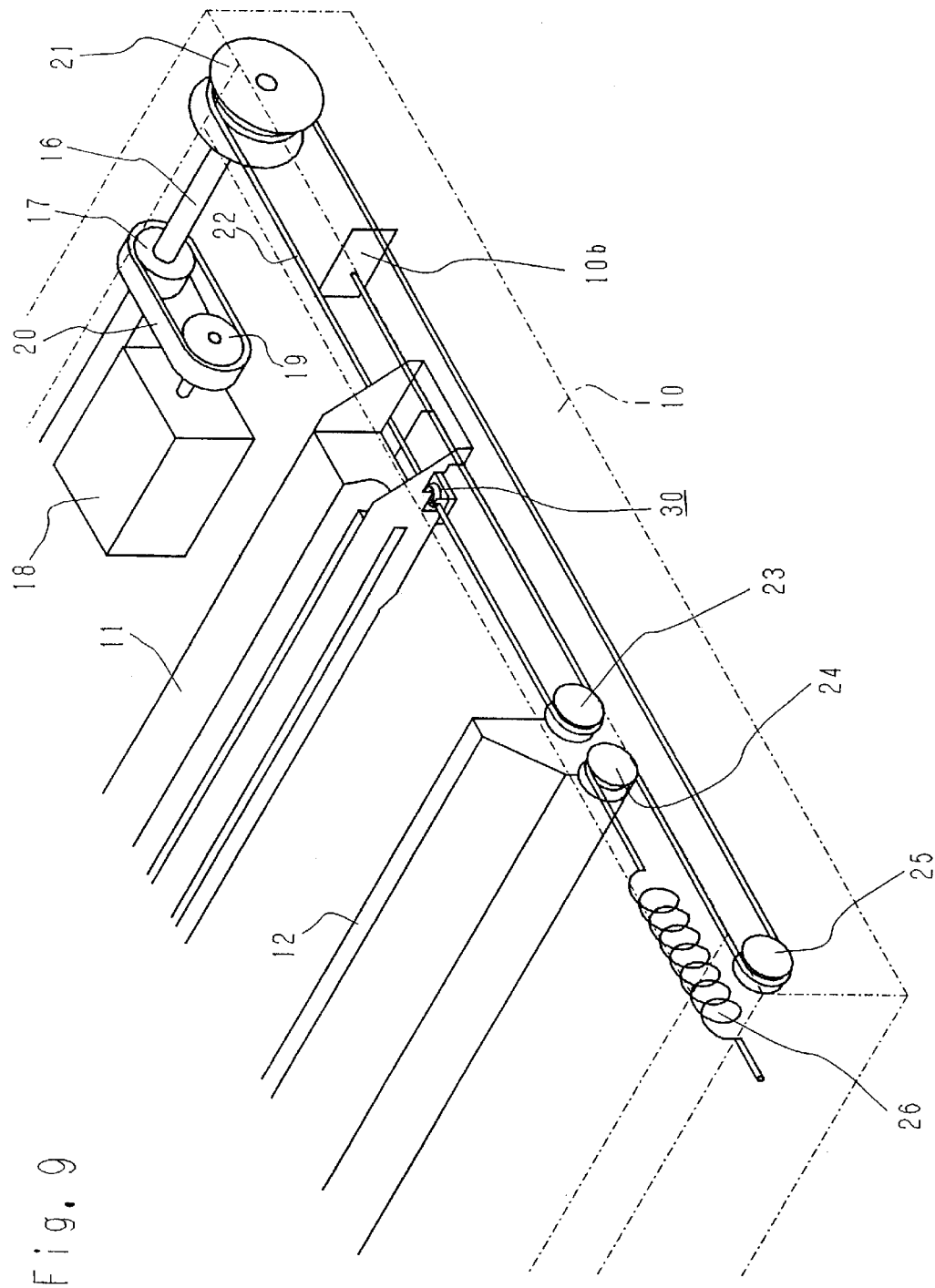
FIG. 9 is a perspective view schematically showing the carrier driving mechanism provided with the inventive anchoring mechanism.
Figure 11:
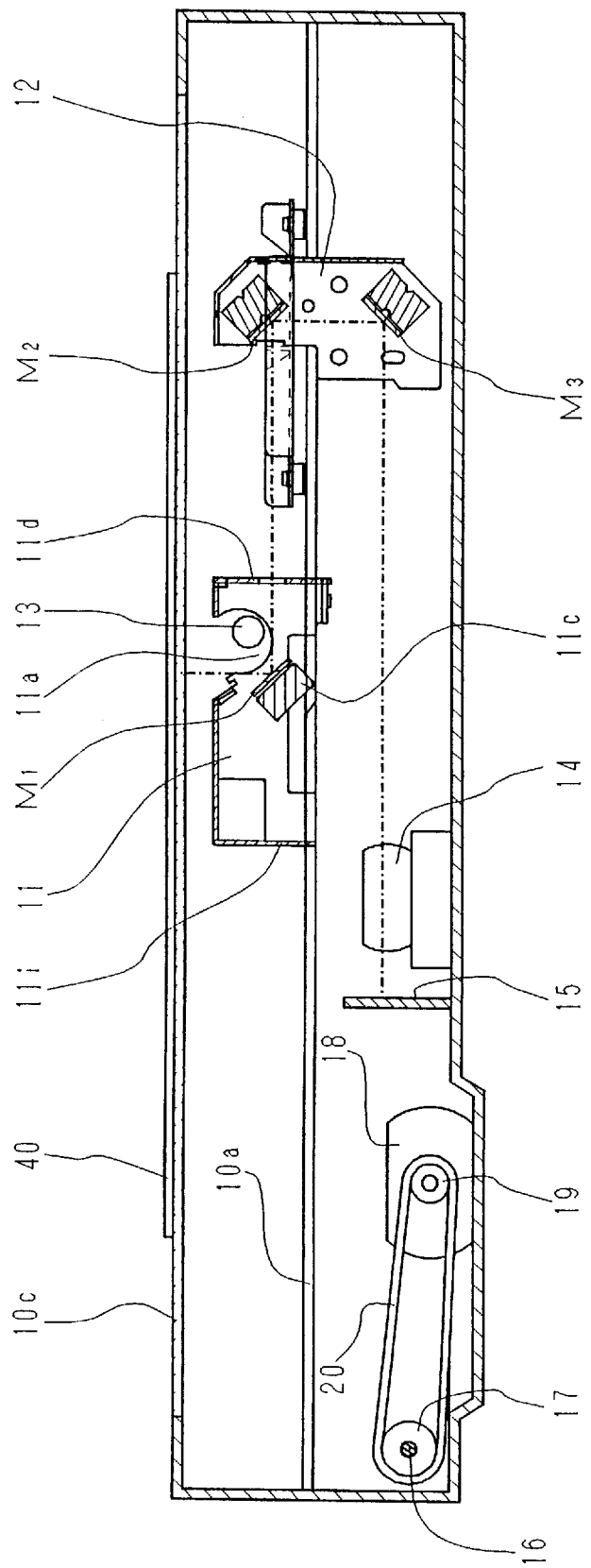
FIG. 11 is a sectional view taken along a vertical plane extending in a direction of scanning, schematically showing the image processor provided with the inventive anchoring mechanism.
Figure 12:
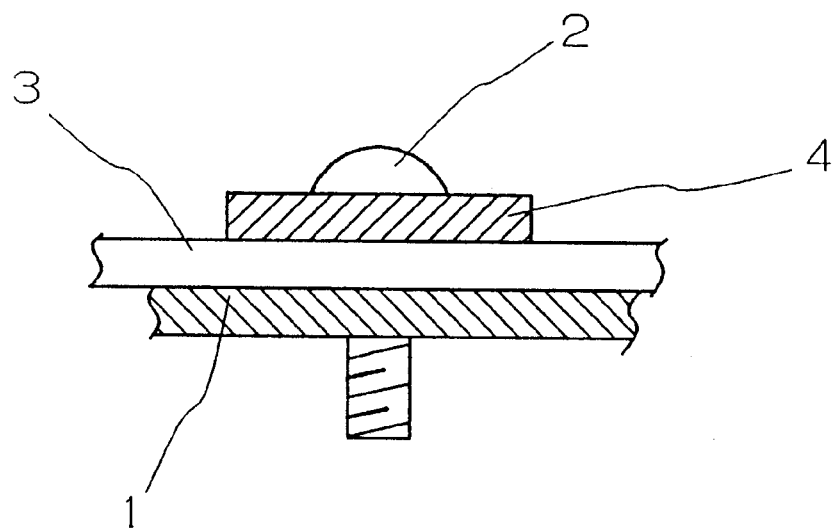
FIG. 12 is a side view schematically showing a conventional anchoring mechanism.

FIG. 8 is a schematic perspective view of an image processor including a carrier driving mechanism provided with an anchoring mechanism according to the invention and FIG. 9 is a schematic perspective view illustrating the carrier driving mechanism. As shown in FIG. 8, a substantially rectangular housing 10 is formed with guides 10a in the form of steps extending inward from respective inner surfaces of transversely opposite side walls of the housing 10. These guides 10a extend longitudinally of the housing 10 so that a first carrier 11 and a second carrier 12 placed on the guides 10a may be slidably moved thereon. As shown in FIG. 11, first carrier 11 is provided with a reflector M1 and second carrier 12 is provided with reflectors M2 and M3 so as to define an optical path serving to direct an image of an original 40, which is placed on a transparent plate glass 10c supported on the upper end of housing 10, to a lens 14. The image transmitted through lens 14 is focused on a CCD 15 serving as an image processing station comprising various elements such as a pick-up element, and thereby processed.

The image is read from the original 40 as carriers 11 and 12 move along the original 40 to scan it. During this movement for scanning, a predetermined relationship must be maintained between first carrier 11 and second carrier 12 so that a length of an optical path extending from the original 40 to CCD 15 can be maintained constant. FIG. 9 illustrates a mechanism for driving first carrier 11 and second carrier 12. A driving shaft 16 having its axis orthogonal to the scanning direction of carriers 11 and 12, is rotatably supported by one of longitudinally opposite ends of housing 10. Driving shaft 16 is provided at its longitudinal middle with a driven pulley 17 fixed thereon. A loop of driving belt 20 is draped on driven pulley 17, on one end, and on a driving pulley 19 fixed around an output shaft of an electric motor 18, on the other end. Driving shaft 16 carries on its longitudinally opposite ends take-up pulleys 21 adapted to be rotated together with driving shaft 16. An intermediate length of wire 22 is wound on each of pulleys 21 by an appropriate number of turns. A pair of guide pulleys 23 and 24 arranged side by side in the scanning direction are supported by second carrier 12 rotatably around their axes orthogonal to the scanning direction on each of its longitudinally opposite end surfaces. At an end of housing 10 opposite to the end rotatably supporting driving shaft 16, guide pulleys 25 are supported by housing 10 rotatably around their axis orthogonal to the scanning direction. The respective side walls of housing 10 are provided at appropriate locations with brackets 10b. It should be understood that the respective pairs of take-up pulleys 21, wire 22, guide pulleys 23, 24, and 25 and brackets 10b are arranged within housing 10 so as to be mutually opposed with a scanning zone therebetween.

Intermediate length of wire 22 wound on take-up pulley 21 has one end passing through means 30, which is operatively associated with first carrier 11, then through guide pulley 23 and anchored on bracket 10b. The other end of wire 22 successively goes through guide pulleys 25 and 24 and is anchored on the side wall of housing 10 with interposition of elastic means 26 such as a tension coil spring.

Figure 1:
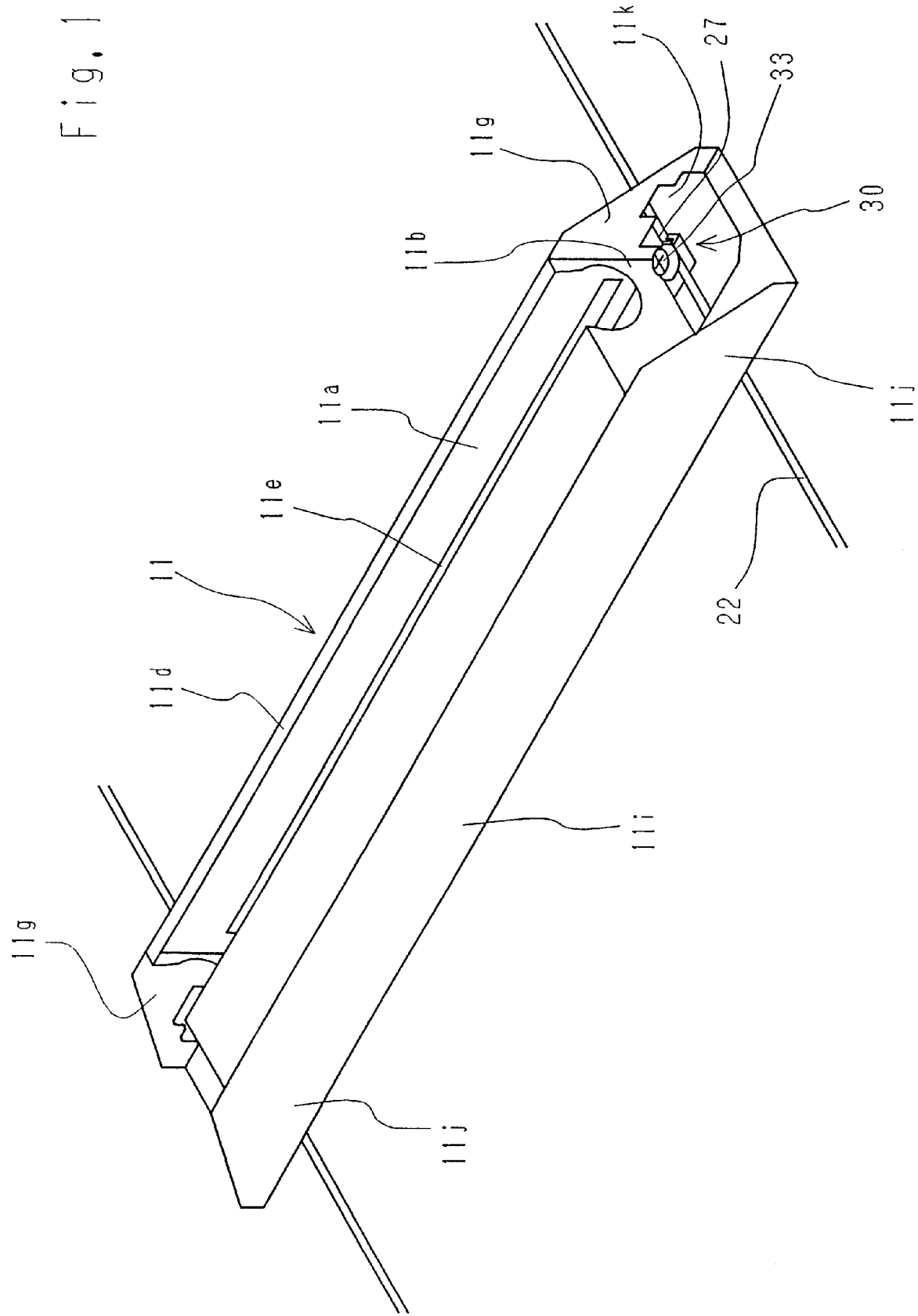
FIG. 1 is a perspective view schematically showing a carrier operatively connected to a wire by an anchoring mechanism according to the invention.
Figure 4:
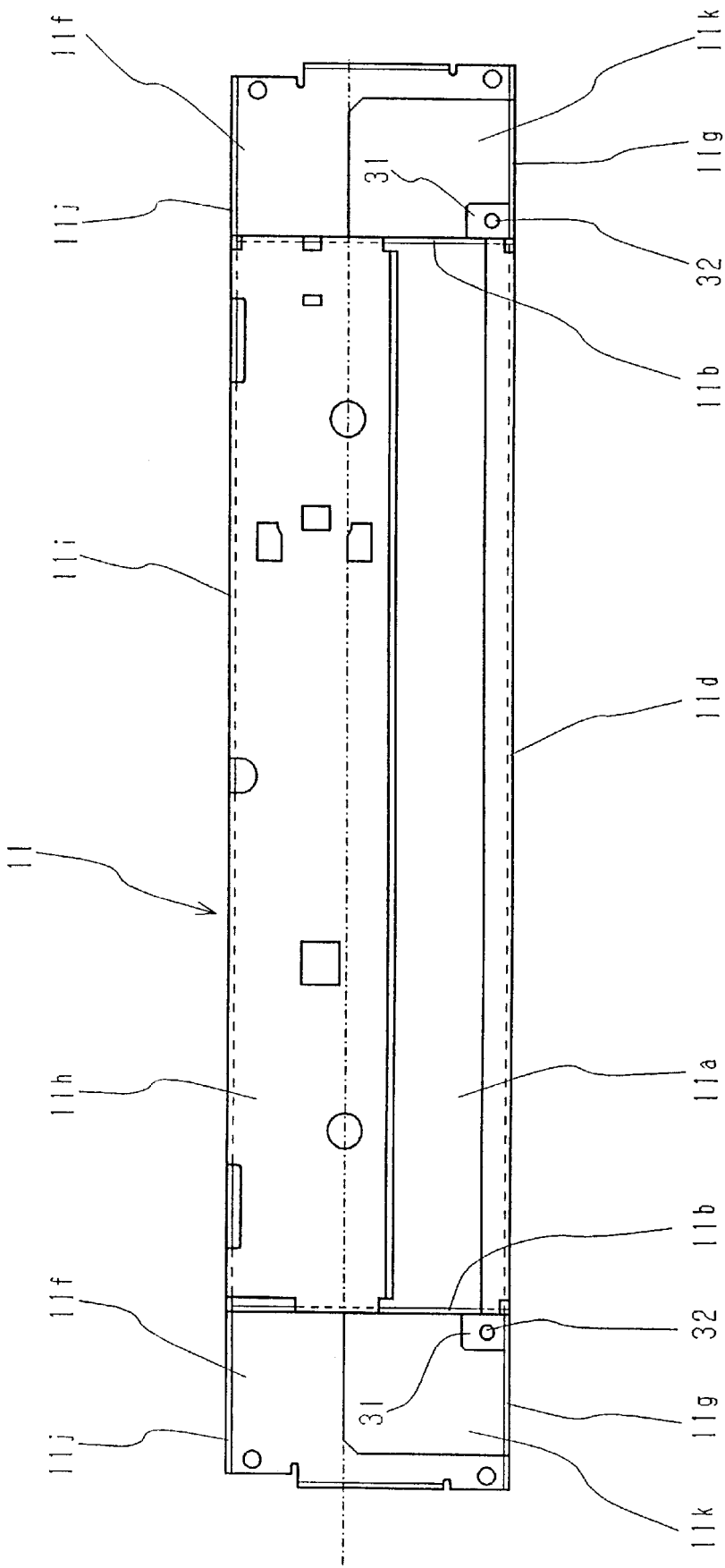
FIG. 4 is a plan view showing the first carrier operatively connected to the wire by the inventive anchoring mechanism.
Figure 5:
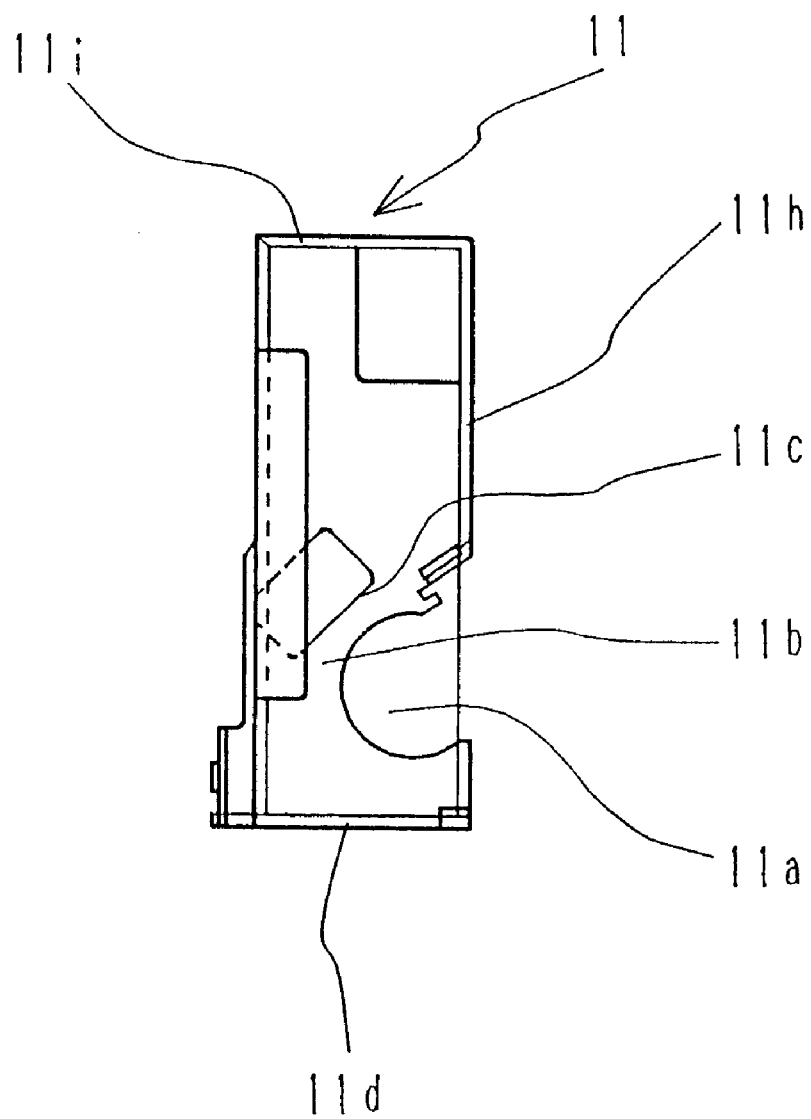
FIG. 5 is a left side view of the first carrier operatively connected to the wire by the inventive anchoring mechanism.
Figure 6:
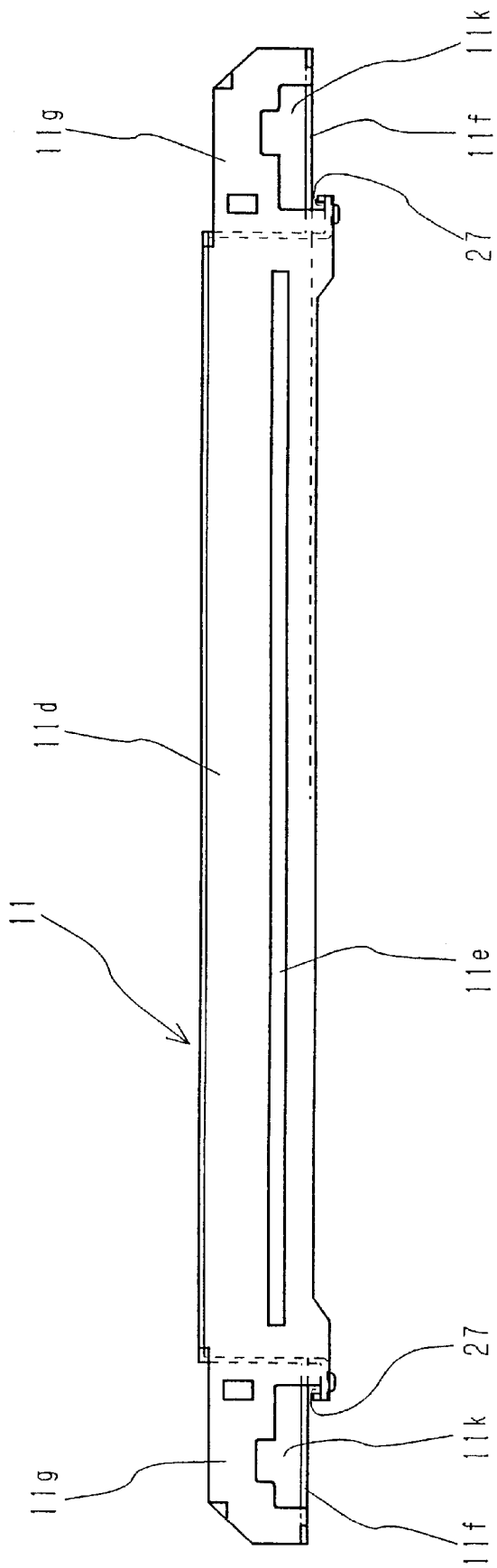
FIG. 6 is a front view showing the first carrier operatively connected to the wire by the inventive anchoring mechanism.

FIGS. 1 and 4 through 6 illustrate a casing for first carrier 11 in perspective, plan, left side and front views, respectively. First carrier 11 has a groove 11a formed in its upper part that extends transversely of the scanning direction. A lamp 13 is provided within groove 11a to illuminate the image of an original 40, as shown in FIG. 8. Groove 11a extends between opposite side walls 11b used to suspend lamp 13. Obliquely below groove 11a, is a holder 11c for reflector M1, as shown in FIG. 5. A rear wall 11d of groove 11a includes a slit 11e as shown in FIGS. 1 and 6 so that light rays that strike reflector M1 are reflected therefrom through slit 11e to reflector M2 provided in second carrier 12, as shown in FIG. 11. A bottom plate of the groove extends outward beyond each of side walls 11b to define a bottom plate section 11f. Rear wall 11d also extends outward beyond each of side walls 11b so as to define a reinforcing wall section 11g for the associated bottom plate section 11f. In front of groove 11a, a casing 11h is provided containing therein a control unit such as a control circuit. A front wall 11i defining casing 11h also has lateral extensions serving as reinforcing wall sections 11j for the respective bottom plate sections 11f. An opening 11k is provided in each of the longitudinally opposite ends of first carrier 11 that extends from the lower edge of reinforcing wall section 11g partially into bottom plate section 11f. The lower end of rear wall section lid slightly extends into opening 11k in the form of an arm having its upper side cut to form retainer means 27.

Figure 2:
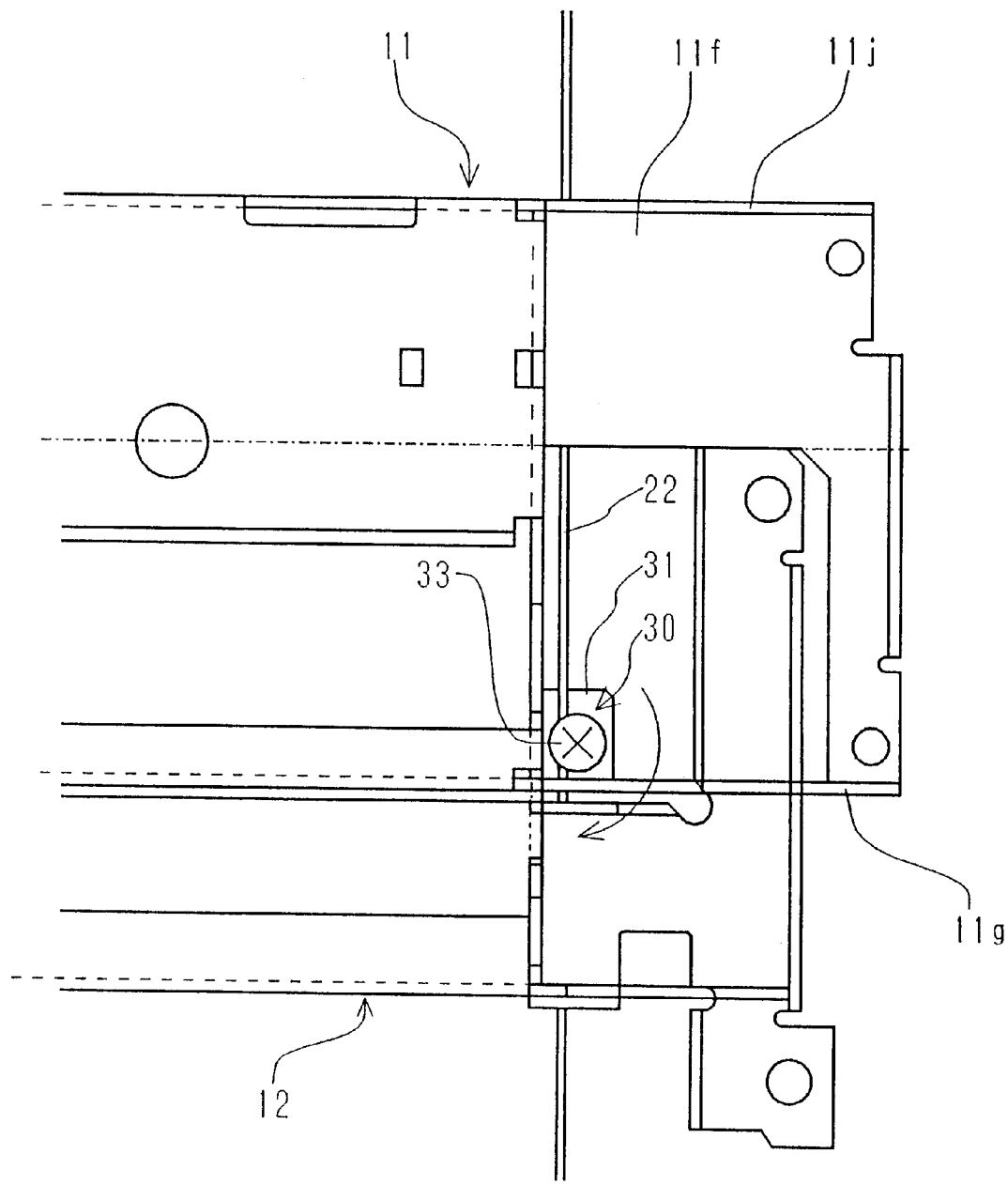
FIG. 2 is a plan view schematically showing a first carrier operatively connected to a wire by the inventive anchoring mechanism and showing a second carrier combined with the first carrier at respective one of their longitudinally opposite ends.
Figure 3:
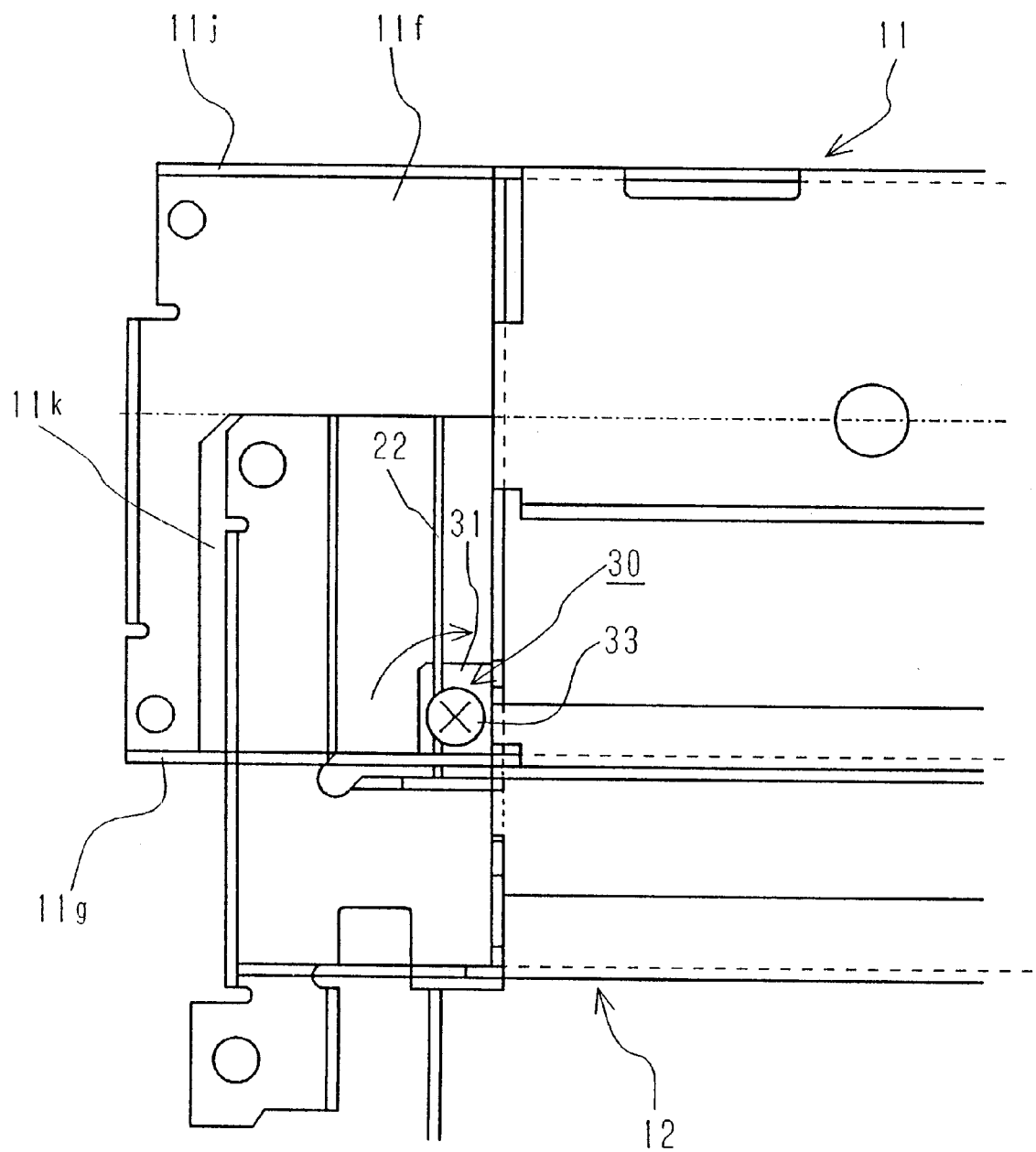
FIG. 3 is a view similar to FIG. 2 schematically showing the first and second carriers at their respective other ends.

Bottom plate section 11f is provided with a bed plate 31 horizontally extending from an edge of opening 11k into opening 11k in proximity of retainer means 27. A threaded hole 32 forming part of clamping means 30 is cut in bed plate 31, as shown in FIGS. 1 and 4. A set screw 33 is threaded into threaded hole 32, as shown in FIGS. 1 through 3, and set screw 33 is driven to clamp wire 22 between the head of set screw 33 and bed plate 31. When a right-handed screw is employed as set screw 33, wire 22 is positioned relative to set screw 33 so that wire 22 is pulled by a force with which set screw 33 is clamped, as will be understood from FIGS. 2 and 3. In other words, wire 22 may be laid on the left side of set screw 33 as viewed in the scanning direction of carriers 11 and 12 (i.e., in the upward direction as viewed in FIGS. 2 and 3) and set screw 33 may be driven in a direction indicated by an arrow in FIGS. 2 and 3 to pull wire 22 toward set screw 33. A direction in which the pulled length of wire reacts corresponds to a direction in which first carrier 11 is driven toward second carrier 12.

Retainer means 27 is formed so as to lie on a position appropriately offset relative to a straight line which extends tangentially to set screw 33 on the side of wire 22 and in parallel to the scanning direction. More specifically, retainer means 27 is formed at a position appropriately offset rightward relative to threaded hole 32 as will be understood in reference with FIGS. 2 and 3. As a result, wire 22 is appropriately curved due to insertion in retainer means 27 and pressed against a side surface of set screw 33 under a restoring force of wire 22 which has been curved.

According to the embodiment as illustrated and described, first carrier 11 is formed by bending a single sheet material.

The specific embodiment of the inventive anchoring mechanism for the carrier driving wire in the image processor has been described hereinabove with respect to its construction. The manner in which this embodiment operates is described below.

Figure 7:
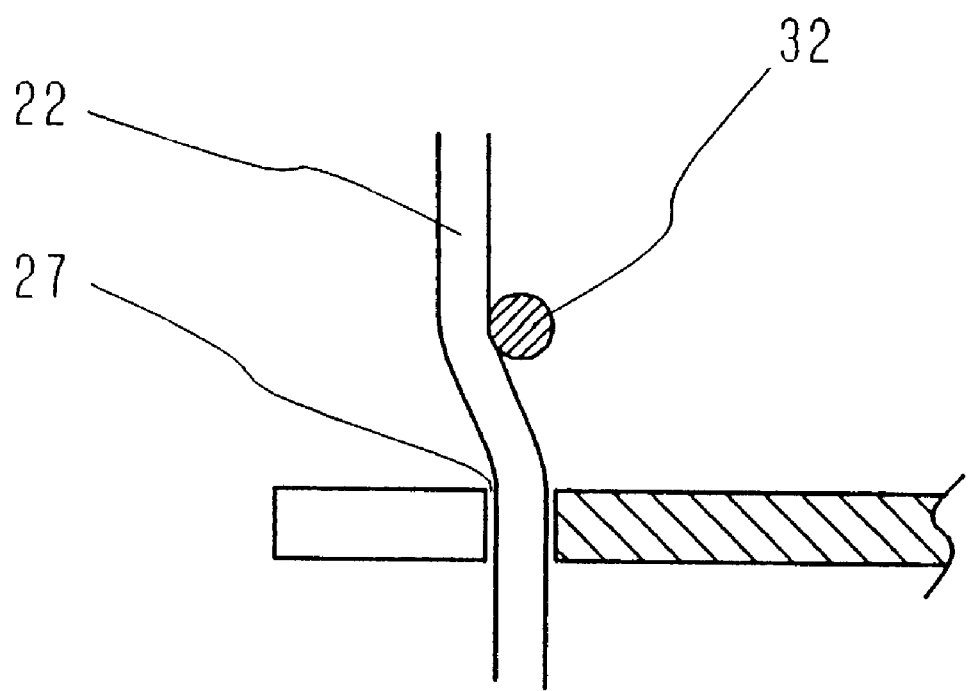
FIG. 7 is a plan view schematically illustrating a manner in which the wire is inserted in the retaining means of the inventive anchoring mechanism.

To lay wire 22 in the manner shown in FIG. 9, wire 22 is inserted in retainer means 27 and then brought in contact with set screw 33 from the left side as viewed in the scanning direction of first carrier 11, as will be apparent from FIGS. 1 through 3. Since retainer means 27 is rightwardly offset relative to threaded hole 32, the length of wire 22 extending between retainer means 27 and set screw 33 is appropriately curved, as shown in FIG. 7. Consequently, wire 22 is pressed against set screw 33 under a restoring force of this curved length of wire 22 and reliably prevented from falling off from set screw 33 during operating of clamping set screw 33. It should be understood here that the operation of anchoring wire 22 to first carrier 11 should be carried out after second carrier 12 has been moved to the end of housing 10 opposite to the end thereof provided with take-up pulley 21 and first carrier 11 has been placed against second carrier 12. Positions of first and second carriers 11 and 12 in this state are their initial positions from which these carriers 11 and 12 start to scan the original 40. Upon clamping set screw 33, the clamping force pulls the length of wire 22 laid on the side of second carrier 12 and a restoring force of this pulled length of wire 22 causes first carrier 11 to be placed against second carrier 12. Such effect facilitates these two carriers 11 and 12 to be set at their initial positions.

Figure 10:
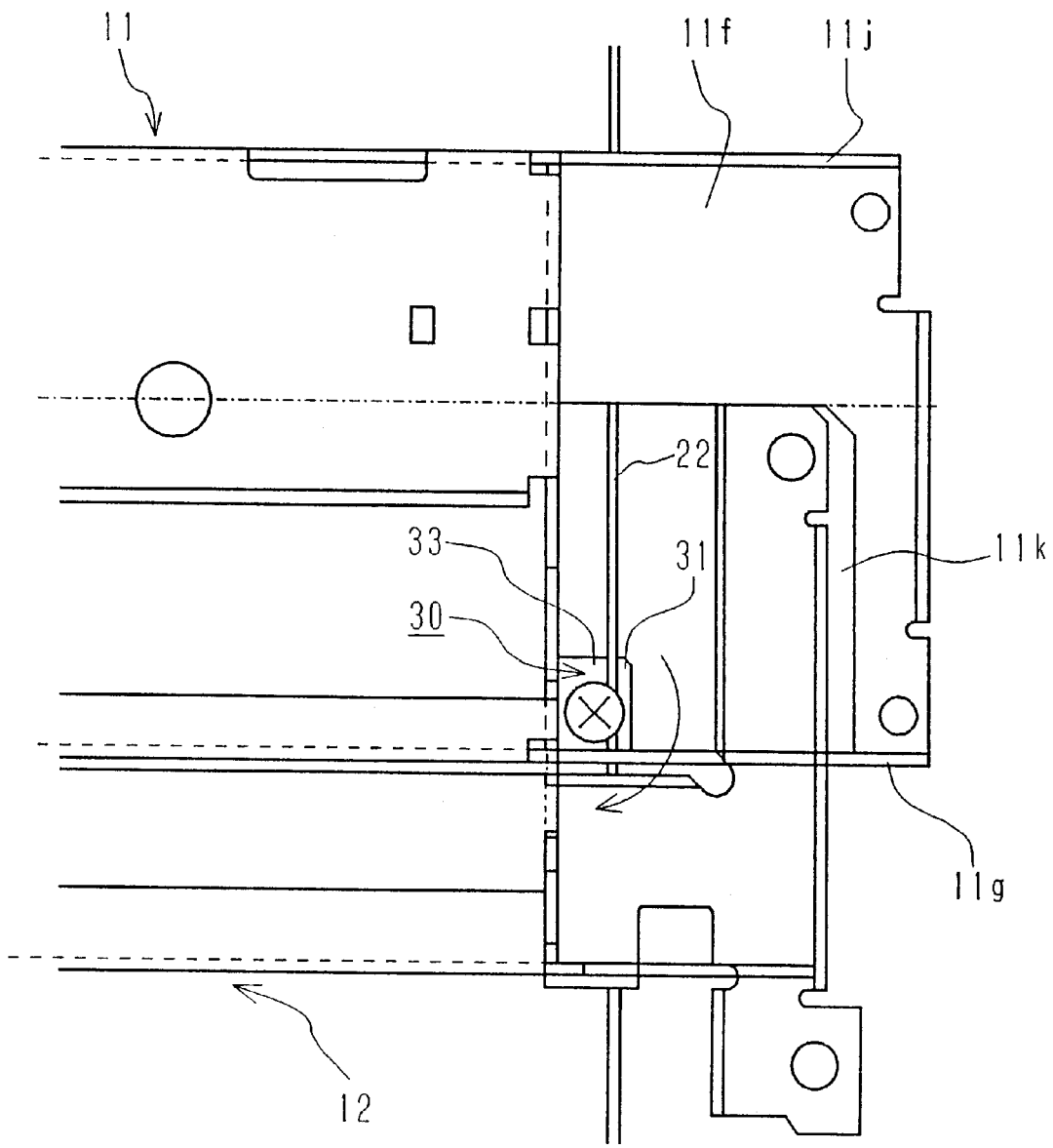
FIG. 10 is a view similar to FIG. 2 illustrating an inconvenience encountered when the wire is placed against a set screw from the side opposed to the side predetermined for the inventive anchoring mechanism.

FIG. 10 illustrates a case in which wire 22 is brought in contact with set screw 33 from the right side as viewed in the scanning direction of first carrier 11. When set screw 33 is a right-handed screw, the length of wire 22 laid on the side of first carrier 11 will be pulled toward set screw 33 if set screw 33 is clamped in a direction indicated by the arrow shown in FIG. 10. Consequently, first carrier 11 will be pulled apart from second carrier 12 under the effect of a restoring force generated by the pulled length of wire 22. This is inconvenient for setting carriers 11 and 12 at their initial positions.

Scanning by carriers 11 and 12 is carried out as each of take-up pulleys 21 is rotated by actuation of electric motor 18 to take up wire 22 on each of take-up pulleys 21. Rotation of take-up pulleys 21, which is clockwise as viewed in FIG. 9, causes take-up pulley 21 to take up wire 22 and thereby causes first carrier 11 to move toward take-up pulley 21. Second carrier 12 moves over one-half of an extent over which first carrier 11 moves since wire 22 goes by way of guide pulleys 23 associated with second carrier 12 to bracket 10b on which wire 22 is anchored. A differential movable distance of travel of these first carrier 11 and second carrier 12 is properly adjusted to maintain the predetermined length of the optical path extending from the original 40 to CCD 15.

As will be apparent from the foregoing description, the inventive anchoring mechanism for carrier driving wire in the image processor is adapted to clamp the wire between the set screw's head and the carrier without any demand for a separately prepared washer or the like to clamp the wire. Such improved arrangement allows the number of parts to be correspondingly reduced. Thus, the image processor can be more readily constructed. In addition, the operation of clamping and anchoring the wire can be simplified because the set screw is driven with the wire being pressed against the set screw.

With the inventive mechanism for anchoring the carrier driving wire in the image processor, the wire may be inserted in the retainer means and thereby a restoring force of the wire may be used to assure that the wire is pressed against the set screw. Further, the wire may thus be adequately curved to generate a restoring force by which the wire is reliably pressed against the set screw. The restoring force generated by inserting the wire in the retainer means in the form of a notch thereby simplifies the operation of anchoring the wire.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

The invention claimed is:

1. An image processor comprising:
a housing;
an image processing unit for processing an image of a scanned original;
a carrier being movable from an initial position to a predetermined position in order to scan the original and thereby to direct an image of the original to said image processing unit;
a rotatably driven pulley;
a wire fastened at one end to said housing and wound at an intermediate position on said rotatably driven pulley; and
an anchoring mechanism for anchoring said wire to said carrier, said anchoring mechanism including a threaded hole formed in said carrier, and a set screw threaded into said threaded hole, wherein said wire is clamped between a head of said set screw and said carrier to operatively connect said carrier to a length of said wire extending from said one end fastened to said housing to said rotatably driven pulley, wherein said anchoring mechanism is configured such that said carrier is biased to move to said initial position as said set screw is threaded into said threaded hole.

2. An image processor comprising:
a housing;
an image processing unit for processing an image of a scanned original;
a carrier being movable from an initial position to a predetermined position in order to scan the original and thereby to direct an image of the original to said image processing unit;
a rotatably driven pulley;
a wire fastened at one end to said housing and wound at an intermediate position on said rotatably driven pulley; and
an anchoring mechanism for anchoring said carrier to an intermediate position of said wire including:
a threaded hole formed in said carrier;
a set screw threaded into said threaded hole for clamping said wire between a head of said set screw and said carrier to operatively connect said carrier to said wire, said set screw being positioned to bias and move said carrier to said initial position as said set screw is threaded into said threaded hole; and
retainer means formed in said carrier for receiving said wire and causing said wire to be sufficiently curved so as to generate a restoring force biasing said wire to be pressed against said set screw.

3. The image processor according to claim 2, wherein said retainer means is formed in a position on said carrier so as to be offset relative to a path along which said wire is laid.

4. The image processor according to claim 3, wherein said retainer means is a notch provided in said carrier.

5. The image processor according to claim 2, wherein said retainer means is a notch provided in said carrier.

* * * * *

UNITED STATES PATENT AND TRADEMARK OFFICE
CERTIFICATE OF CORRECTION

PATENT NO. : 6,091,517
DATED : July 18, 2000
INVENTOR : Eiichi Hayashi

It is certified that errors appear in the above-identified patent and that said Letters Patent is hereby corrected as shown below:

On the Title Page

Abstract, line 4;
    "connect" should be - - connecting - -;

Col. 1, line 22;
    "mechanisms" should be - - mechanism - -;

Col. 4, line 26;
    "lid" should be - - lld - -;

Col. 5, line 8;
    "operating" should be - - operation - -.

Signed and Sealed this

Tenth Day of April, 2001

Attest:

NICHOLAS P. GODICI

*Attesting Officer*      *Acting Director of the United States Patent and Trademark Office*